US010691479B2

(12) United States Patent
Ganesan et al.

(10) Patent No.: US 10,691,479 B2
(45) Date of Patent: Jun. 23, 2020

(54) VIRTUAL MACHINE PLACEMENT BASED ON DEVICE PROFILES

(71) Applicant: VMWARE, INC., Palo Alto, CA (US)

(72) Inventors: Hariharan Jeyaraman Ganesan, Bangalore (IN); Jinto Antony, Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 133 days.

(21) Appl. No.: 15/798,400

(22) Filed: Oct. 31, 2017

(65) Prior Publication Data

US 2019/0004845 A1    Jan. 3, 2019

(30) Foreign Application Priority Data

Jun. 28, 2017 (IN) .............................. 201741022624

(51) Int. Cl.
  *G06F 9/455* (2018.01)
  *G06F 9/445* (2018.01)
  *G06F 9/50* (2006.01)

(52) U.S. Cl.
  CPC ...... *G06F 9/45558* (2013.01); *G06F 9/44505* (2013.01); *G06F 9/5077* (2013.01); *G06F 2009/4557* (2013.01)

(58) Field of Classification Search
  CPC ......... G06F 9/45558; G06F 2009/4557; G06F 9/5077; G06F 9/5088; G06F 9/44505
  See application file for complete search history.

(56) References Cited

U.S. PATENT DOCUMENTS

| 2008/0189468 | A1* | 8/2008 | Schmidt | G06F 11/203 711/6 |
| 2009/0064136 | A1* | 3/2009 | Dow | G06F 9/4856 718/1 |
| 2009/0265708 | A1* | 10/2009 | Nakajima | G06F 9/45558 718/1 |
| 2010/0205395 | A1* | 8/2010 | Srinivasan | G06F 9/45558 711/170 |
| 2010/0228903 | A1* | 9/2010 | Chandrasekaran | G06F 9/45558 711/6 |
| 2010/0242045 | A1* | 9/2010 | Swamy | G06F 9/455 718/104 |
| 2010/0281478 | A1* | 11/2010 | Sauls | G06F 9/5077 718/1 |
| 2011/0202640 | A1* | 8/2011 | Pillutla | G06F 9/4856 709/221 |
| 2012/0265959 | A1* | 10/2012 | Le | G06F 9/45558 711/162 |
| 2012/0297380 | A1* | 11/2012 | Colbert | G06F 9/45558 718/1 |
| 2015/0058555 | A1* | 2/2015 | Karamanolis | G06F 3/0689 711/114 |
| 2015/0178109 | A1* | 6/2015 | Li | G06F 9/45558 718/1 |

* cited by examiner

*Primary Examiner* — Tuan C Dao

(57) ABSTRACT

Techniques for placing virtual machines based on compliance of device profiles are disclosed. In one embodiment, a list of device profiles may be maintained, each device profile including details of at least one virtual device and associated capabilities. Further, a first device profile from the list of device profiles may be assigned to a virtual machine. Furthermore, the virtual machine may be placed on a host computing system based on compliance of the first device profile.

20 Claims, 8 Drawing Sheets

| S.NO | DEVICE PROFILE DATA | HOST/CLUSTER | VM | DEVICE PROFILE | COMPLIANCE |
|---|---|---|---|---|---|
| 1 | SSD (250 GB), FAX MODULE | HOST 1 | VM1,VM3 | PROFILE 1 | COMPLIANT |
| 2 | DDR3,SATA HDD | HOST 3, CLUSTER3 | VM6,VM9,VM21 | PROFILE 7 | COMPLIANT |
| 3 | WIFI MODULE, USB 3.0 | HOST 6 | VM8,VM10 | PROFILE 1 | NON COMPLIANT |
| 4 | GPU, 10GB ETHERNET,SCSI,SUPER IO | HOST 9 | VM5 | PROFILE 3 | COMPLIANT |
| 5 | IEEE 1394, INFIBAND | HOST 14, CLUSTER6 | VM2,VM4 | PROFILE 4 | COMPLIANT |

VIRTUAL MACHINE PLACEMENT BASED ON DEVICE PROFILES

RELATED APPLICATIONS

Benefit is claimed under 35 U.S.C. 119(a)-(d) to Foreign Application Serial No. 201741022624 filed in India entitled "VIRTUAL MACHINE PLACEMENT BASED ON DEVICE PROFILES", on Jun. 28, 2017, by VMware, Inc., which is herein incorporated in its entirety by reference for all purposes.

The present application is related in subject matter to U.S. patent application Ser. No. 15/798,411 which is incorporated herein by reference.

TECHNICAL FIELD

The present disclosure relates to cluster resource management, and more particularly to methods, techniques, and systems for placing virtual machines in a cluster based on compliance of device profiles.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. Each VM is a complete execution environment, and the server provides a user interface over the network connection so that user inputs and outputs are communicated between the user and the VM.

Further, host computing systems may be configured with one or more virtual devices such as a virtual network interface card (vNIC), a virtual compact disc read-only-memory (vCDROM), a virtual graphics processing unit (vGPU) card, a virtual small computer system interface (vSCSI) card, a raw device mapping (RDM) disk, and the like. Furthermore, different generations of host computing systems can support different types of virtual devices.

Hardware/device upgrades, support for new virtual devices/existing virtual devices firmware, or peripheral device upgrades may be performed for business compulsions along with security concerns. During migrations or post failover, critical VMs in need of a specific virtual device or updating virtual device configurations may experience a significant downtime.

Figure 1:
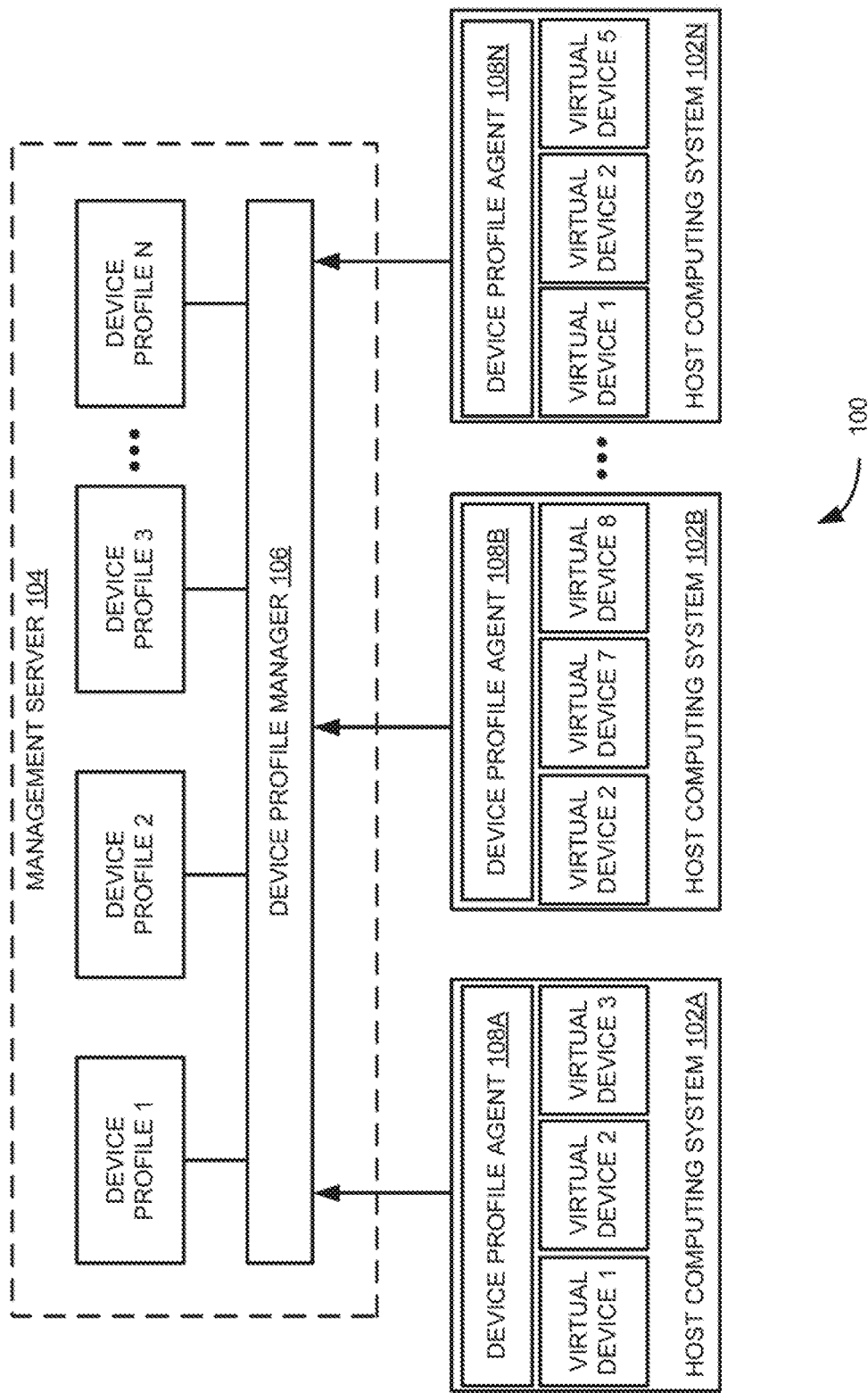
FIG. 1 is an example system view of a virtualized computing environment illustrating maintaining mapping information between device profiles and host computing systems in a cluster.

The drawings described herein are for illustration purposes only and are not intended to limit the scope of the present subject matter in any way.

DETAILED DESCRIPTION

Embodiments described herein may provide enhanced computer-based and network-based method, technique, and system for placement of VMs in a cluster based on compliance of device profiles. The VMs, in some embodiments, may operate with their own guest operating systems on a host computing system using resources of the host computing system virtualized by virtualization software (e.g., a hypervisor, virtual machine monitor, and the like). The term "placement" may refer to an initial placement of VMs, placement while powering on VMs, placement during migration of VMs, placement during provisioning of VMs, placement during creation of VMs, or placement during clone of VMs. Further, the term "device profile" may refer to a logical entity of a group of available virtual devices and associated device capabilities that the host computing systems can support in a data center inventory.

During failover or load balancing in the cluster, VMs may need to be powered on or migrated to a suitable host computing system that can support the VM specifications/requirements. For example, a management server may not locate a suitable host computing system where the VM specification is honored at real time during load balancing, to keep the VM running state with the required hardware devices available. Further, a high availability fault domain manager (FDM) may not failover the VMs to a suitable host computing system that can support the current VM backend requirement and configurations, and may not recover the device configuration parameters in a destination host computing system.

Furthermore, the VMs cannot be rightly provisioned with a host computing system compatibility check, to suit the needs of the virtual devices that are connected to the VM. For example, some application may need a specific virtual device mapped to a specific hardware device (e.g., specific video graphics array (VGA) card, graphics processing unit (GPU) card, and the like) for the VM to operate. Some software license may be linked to the virtual devices. Some high availability solutions may need specific media access control (MAC) settings for vNICs. Some high availability solutions may need specific SCSI channel settings (e.g., type, ID, channel, and the like) for the virtual SCSI cards. In Linux operating system (OS), the MAC address of the vNIC may need to be maintained to operate the VMs.

Examples described herein may provide a list of device profiles, each device profile including details of at least one virtual device and associated capabilities. Further, a first device profile from the list of device profiles may be attached to a VM. Furthermore, a device profile manager may assist in finding a suitable host computing system that can support/honor the attached first device profile. The VM may be placed on the host computing system based on compliance of the first device profile.

Examples described herein may provide device profiles that can ensure the requested virtual devices are complaint and supported by the host computing systems in the data center inventory and be available in the management application (e.g., vSphere virtual center that is offered by VMware). The management application can be provided in a physical server, VM, or container. Examples described herein may secure the load balancing of VMs in the cluster with known available virtual device slots and current virtual device states. Examples described herein may provide high availability protections in the right host computing systems where the virtual devices associated with the VMs can be honored. Examples described herein may enable placing the fault tolerance (FT) VMs in the right host computing systems.

System Overview and Examples of Operation

FIG. 1 is an example system view of a virtualized computing environment 100 illustrating maintaining mapping information between device profiles (e.g., device profiles 1-N) and host computing systems 102A-102N in a cluster. As shown in FIG. 1, host computing systems 102A-N may include device profile agents 108A-N, respectively. Further, host computing systems 102A-N may support virtual devices (e.g., virtual devices 1, 2, 3, 5, 7, and 8). For example, host computing system 102A may support virtual devices 1-3, host computing system 102B may support virtual devices 2, 7, and 8, and host computing system 102N may support virtual devices 1, 2, and 5. Each host computing system 102A-N may include VMs running therein. Example virtual device may include, but not limited to, a virtual network interface card (vNIC), a virtual compact disc read-only-memory (vCDROM), a virtual graphics processing unit (vGPU) card, a virtual small computer system interface (vSCSI) card, and a raw device mapping (RDM) disk.

Further, virtualized computing environment 100 may include a management server 104 communicative with host computing systems 102A-N. Management server 104 may include a device profile manager 106. Device profile manager 106 can be a part of management software residing in management server 104. One skilled in the art can appreciate that device profile manager 106 can also be provided in a software application that can run on host computing systems 102A-N.

Device profile manager 106 may maintain a list of device profiles 1-N, each device profile including details of virtual devices and associated capabilities. The list of device profiles 1-N may be stored in, for instance, memory of management server 104. Further, device profile manager 106 may maintain mapping information, which includes mapping of the list of device profiles 1-N to a corresponding one of a plurality of host computing systems 102A-N that supports the device profiles. For example, a device profile may be a logical entity of a group of available virtual devices 1, 2, 3, 5, 7, and 8 and associated device capabilities that host computing systems 102A-N can support in the data center inventory. The device profiles can be created, edited, or deleted and can be associated to the VMs to achieve relevant device configurations. Some of the virtual devices may be associated with a physical device.

Further, device profile manager 106 may be communicative with device profile agents 108A-N to obtain information related to addition, modification, or deletion of virtual devices and associated versions in host computing systems 102A-N via a corresponding device profile agent 108A-N residing in host computing systems 102A-N. Each of device profile agents 108A-N may reside in one of host computing systems 102A-N and capable of retrieving addition, modification, deletion, and/or capabilities of virtual devices and associated versions and publishing back to device profile manager 106. Device profile manager 106 may update the mapping information based on the obtained information. In one example, device profile manager 106 may receive/obtain information related to addition, modification, or deletion of virtual devices and associated versions through a push or pull mechanism. In the pull mechanism, device profile manager 106 may request and pull the information from the device profile agents 108A-N. In push mechanism, device profile agents 108A-N may push the information to device profile manager 106.

Figure 2:
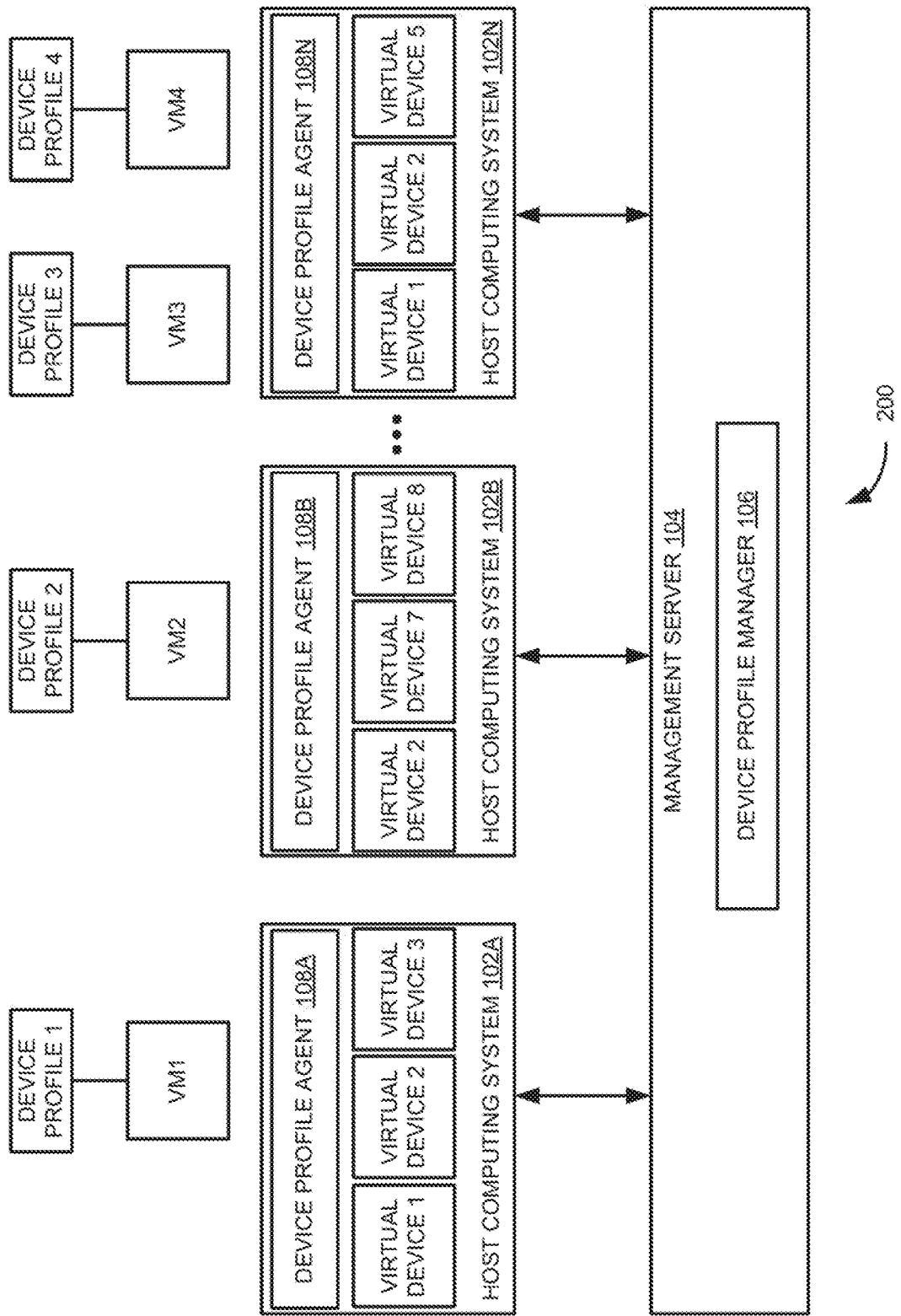
FIG. 2 is an example system view of a virtualized computing environment illustrating assigning the device profiles to virtual machines (VMs) in the cluster.

FIG. 2 is an example system view of a virtualized computing environment 200 illustrating assigning the device profiles 1-N to VMs in the cluster. Device profile manager 106 may assign a device profile from the list of device profiles 1-N to a VM. For example, as shown in FIG. 2, profiles 1-4 are assigned to VMs 1-4, respectively. Further, device profile manager 106 may place the VMs 1-4 on respective host computing systems 102A-N based on compliance of the device profiles 1-4. In one embodiment, device profile manager 106 may identify a host computing system that complies with a first device profile that is attached to the VM based on the mapping information, and place the VM on the identified host computing system based on the compliance of the first device profile. An example for placing the VMs on the host computing system is explained in FIG. 3.

In one example, device profile manager 106 may select the host computing system that supports the first device profile, and migrate the VM to the selected host computing system during load balancing in the cluster. An example of migrating the VM during load balancing is explained in FIG. 4.

In another example, device profile manager 106 may select the host computing system that supports the first device profile, and power on the VM on the selected host computing system during high availability failover. An example for powering on the VM on the selected host computing system during high availability failover is explained in FIG. 5.

For example, consider a cluster having 10 host computing systems (i.e., H1 to H10). Further, consider a VM (VM1) is attached with a device profile (A) and placed on host computing system H1. Also, consider that the device profile A holds all needed configurations of the virtual devices associated with host computing systems (H1, H2, and H5). In other words, host computing systems H1, H2, and H5 may support/honor the device profile A. When device profile manager 106 checks for the compliance of the device profile A, VM1 placed on host computing system H1 can take care of the VM compatibility based on the attached device profile A. Consider that VM1 goes for a load balancing due to resource constraints. Distributed resource scheduling mechanism supporting device profiling may enable migration of VM1 to a host computing system H2 or H5 based on the virtual device slots availability since H2 and H5 supports the device profile A. Similarly, device profile manager 106 may check for compliance of device profile A during initial placements, high availability and fault tolerance conditions of VM1.

Figure 3:
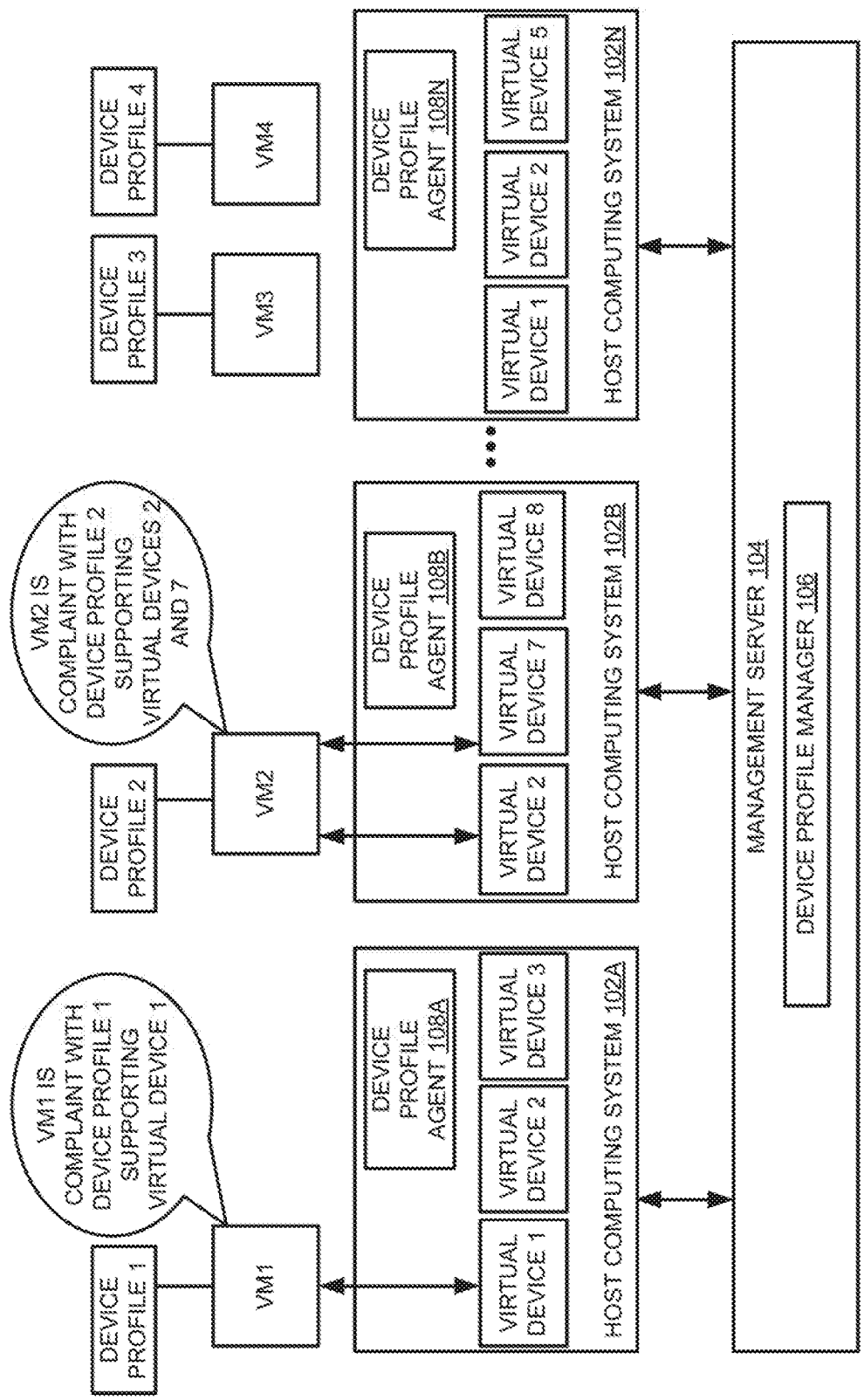
FIG. 3 is an example system view of a virtualized computing environment illustrating placement of VMs on the host computing systems based on compliance of the device profiles.

FIG. 3 is an example system view of a virtualized computing environment 300 illustrating placing VM1 and VM2 on host computing systems 102A and 102B, respectively, based on compliance of device profiles 1 and 2. As shown in FIG. 3, VM1 is complaint with device profile 1 supporting virtual device 1. Therefore, VM1 is provisioned/placed on host computing system 102A that supports device profile 1. Further, VM2 is complaint with device profile 2 supporting virtual devices 2 and 7. Therefore, VM2 is provisioned/placed on host computing system 102B that supports device profile 2.

Figure 4:
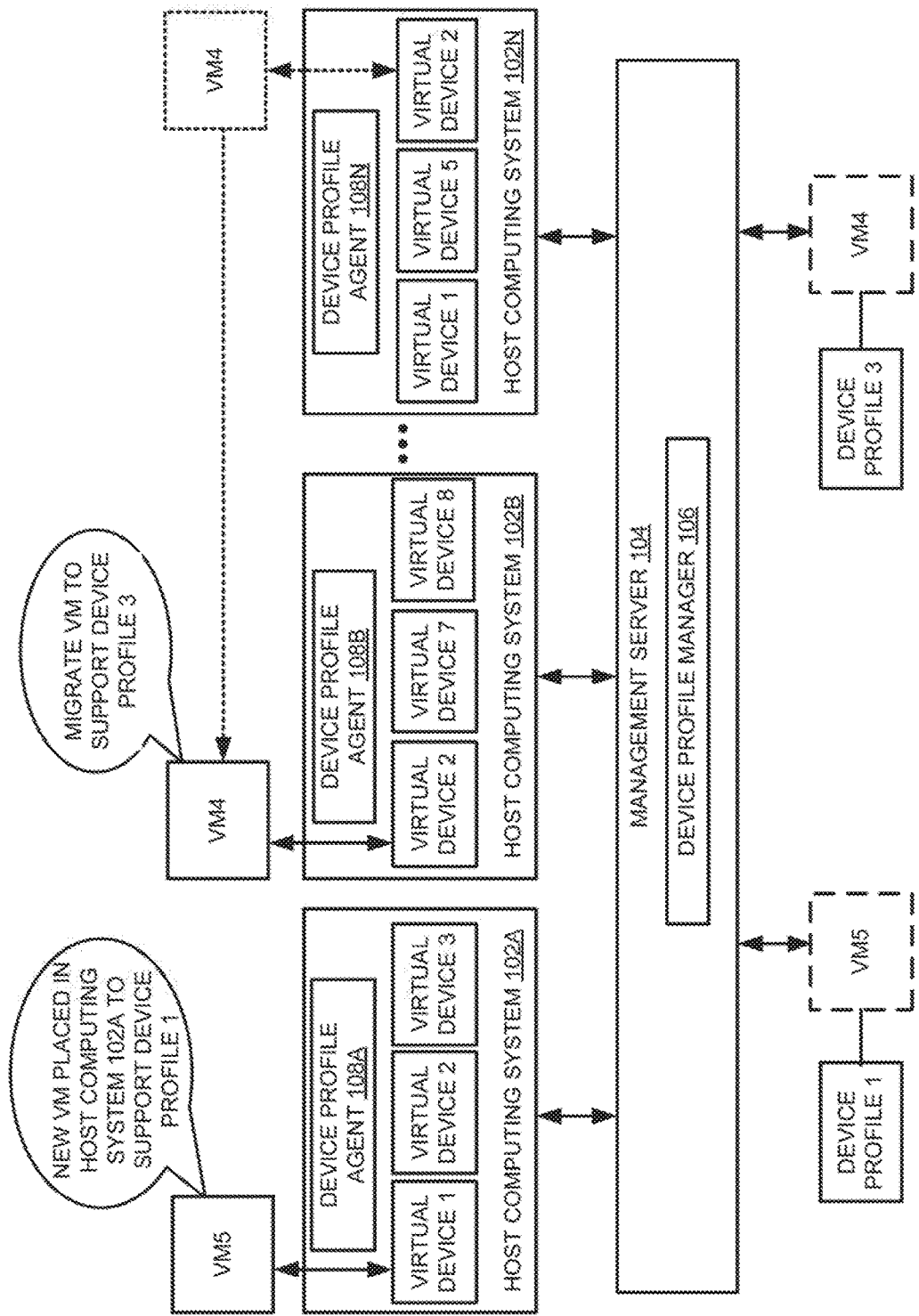
FIG. 4 is an example system view of a virtualized computing environment illustrating migrating a VM to a selected host computing system during load balancing in the cluster.

FIG. 4 is an example system view of a virtualized computing environment 400 illustrating migrating VM4 to host computing system 102B during load balancing in the cluster. As shown in FIG. 4, device profile manager 106 assigns device profile 1 to a new VM5 and device profile 3 to existing VM4 running on host computing system 102N via reconfigurations. In one example, new VM5 can be placed on host computing system 102A that supports device profile 1. In another example, VM4 can be migrated from host computing system 102N to host computing system 102B that supports device profile 3 (i.e., virtual device 2). In these examples, host computing system 102B that supports device profile 3 can be identified using the mapping information. Further, VM4 can be migrated to host computing system 102B using a distributed resource scheduling mechanism that considers resources (e.g., processor, memory, and the like) availability in host computing system 102B for migrating VM4.

Figure 5:
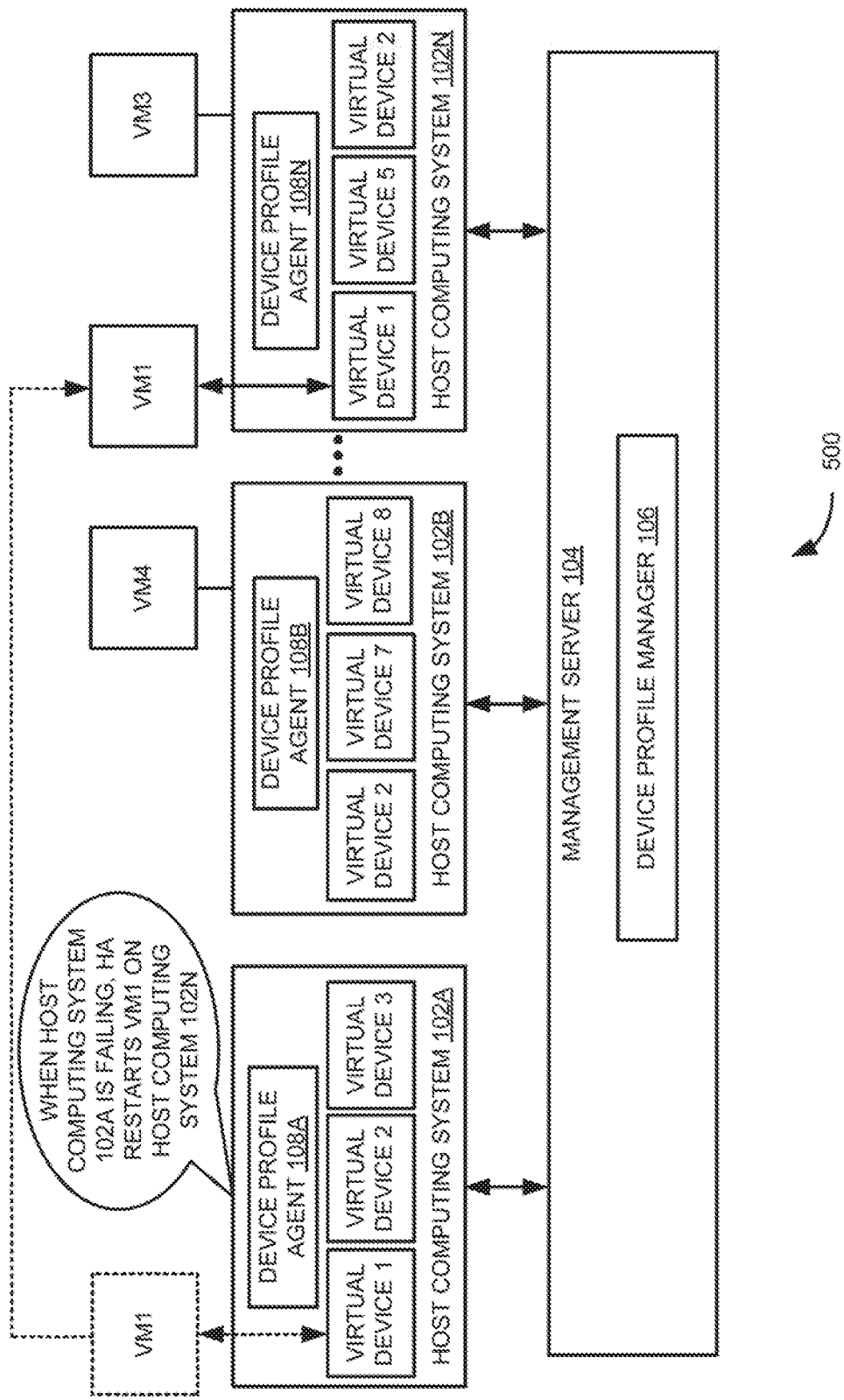
FIG. 5 is an example system view of a virtualized computing environment illustrating powering on the VM on a selected host computing system during high availability failover in the cluster.

FIG. 5 is an example system view of a virtualized computing environment 500 illustrating powering-on VM1 on host computing system 102N during high availability failover in the cluster. The term "high availability failover" may refer to failure of at least one host computing system in the high availability enabled cluster. VM1 running on host computing system 102A is complaint with device profile 1 supporting virtual device 1. During high availability failover (i.e., when host computing system 102A fails), device profile manager 106 may identify host computing system 102N that supports device profile 1 (i.e., virtual device 1) using the mapping information and then restart/power-on VM1 on identified host computing system 102N. In one example, VM1 can be restarted on host computing system 102N using a high availability failover mechanism and distributed resource scheduling mechanism that considers resource availability in host computing system 102N.

Figures 6, 7:
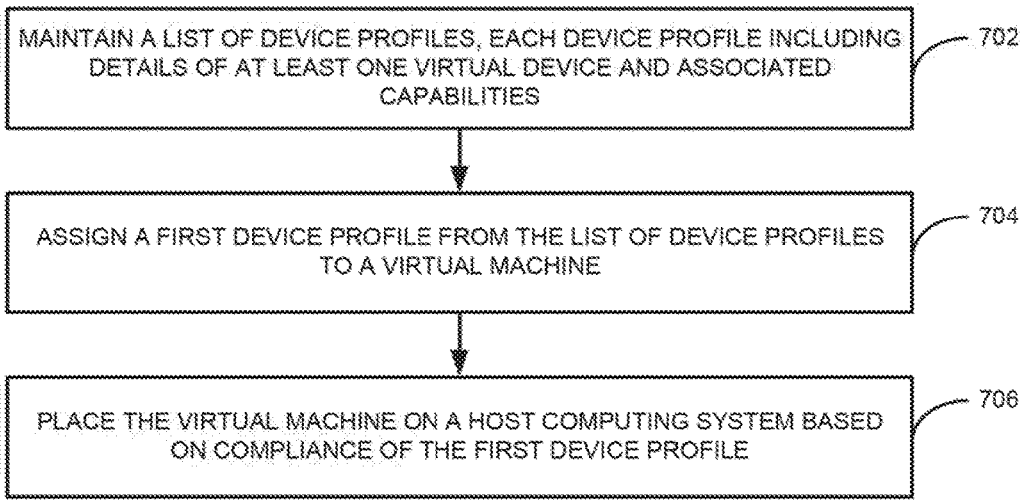
FIG. 6 is an example table depicting metadata stored in the device profile manager.
FIG. 7 is a flow diagram of an example method for placing a VM on a host computing system based on a device profile associated with the VM.

FIG. 6 is an example table 600 depicting metadata stored in device profile manager 106. Example metadata may include mapping information that maps device profiles to host computing systems that supports/complies with the device profiles. Further, table 600 depicts assigning device profiles to VMs in the cluster. As shown in row 602 of table 600, device profile 1 may include details of virtual devices (e.g., SSD (250 GB) and fax module) and associated capabilities. Further, device profile 1 may be attached to VM1 and VM3. Furthermore, host computing system (i.e., host 1) may supports/complies with device profile 1. Therefore, VM1 and VM3 are placed on host 1 that complies with device profile 1. In another example, host computing system (i.e., host 6) does not support/compliant with device profile 1 (e.g., row 604). Therefore, VMs with assigned device profile 1 cannot be provisioned on host 6 since host 6 is not compliant with device profile 1.

An example of device profile manager 106 can be implemented in VMware vRealize Automation™ and/or virtualization management functionalities\features (e.g., VMware vSphere® High Availability (HA), VMware vSphere® Distributed Resource Scheduler™ (DRS), and the like) offered by VMware. In one example, device profile manager 106 may be implemented as engines or modules comprising any combination of hardware and programming to implement the functionalities described herein. Device profile manager 106 can be a service process in the management application or can be an appliance running in the data center to cater multiple management applications in a cloud based environment. For example, management application may be vSphere virtual center that is offered by VMware. Management application can be provided in a physical server, VM, or container. Device profile manager 106 can process the device profiles, validate whether the associated device profile can honor the virtual device requirements of the VM with respect to the host computing systems available, and accordingly apply the recommendations via the DRS and HA.

In some examples, the functionalities described herein, in relation to instructions to implement functions of device profile manager 106 and any additional instructions described herein in relation to the storage medium, may be implemented as engines or modules comprising any combination of hardware and programming to implement the functionalities of the modules or engines described herein. The functions of device profile manager 106 may also be implemented by the processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Although certain terms are used primarily herein, other terms could be used interchangeably to yield equivalent embodiments and examples. For example, the term "host computing system" may be used interchangeably with "physical host", "physical machine" or "physical device". Further, the terms "dynamic" and "automatic" are also used interchangeably throughout the document. Further for example, it is well-known that equivalent terms in the field of system virtualization or similar or related fields could be substituted for such terms as "physical computer," "hypervisor," "VM," or the like. Furthermore, the terms "cluster" may refer to a group of host computing systems that work together in a physical or virtual computing environment.

Example Processes

FIG. 7 is a flow diagram 700 of an example method for placing a VM on a host computing system based on a device profile associated with the VM. It should be understood that the process depicted in FIG. 7 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 702, a list of device profiles may be maintained, each device profile including details of at least one virtual device and associated capabilities. For example, some virtual devices may be associated with associated physical devices. The list of device profiles may be maintained in memory of a server. Memory may be an internal memory or an external storage device connected to the server.

Further, mapping information may be maintained in the memory of the server. The mapping information may map the list of device profiles to a corresponding one of a plurality of host computing systems that supports the device profiles. At step 704, a first device profile from the list of device profiles may be assigned to a VM.

At step 706, the VM may be placed on a host computing system based on compliance of the first device profile. For example, the host computing system that complies with the first device profile may be identified based on the mapping information. The VM may be placed on the identified host computing system based on the compliance of the first device profile.

In one example, the host computing system that supports the first device profile may be selected, and the VM may be migrated to the selected host computing system during load balancing in a cluster. In another example, the host computing system that supports the first device profile may be selected and the VM may be powered-on on the host computing system during high availability failover in the cluster.

Figure 8:
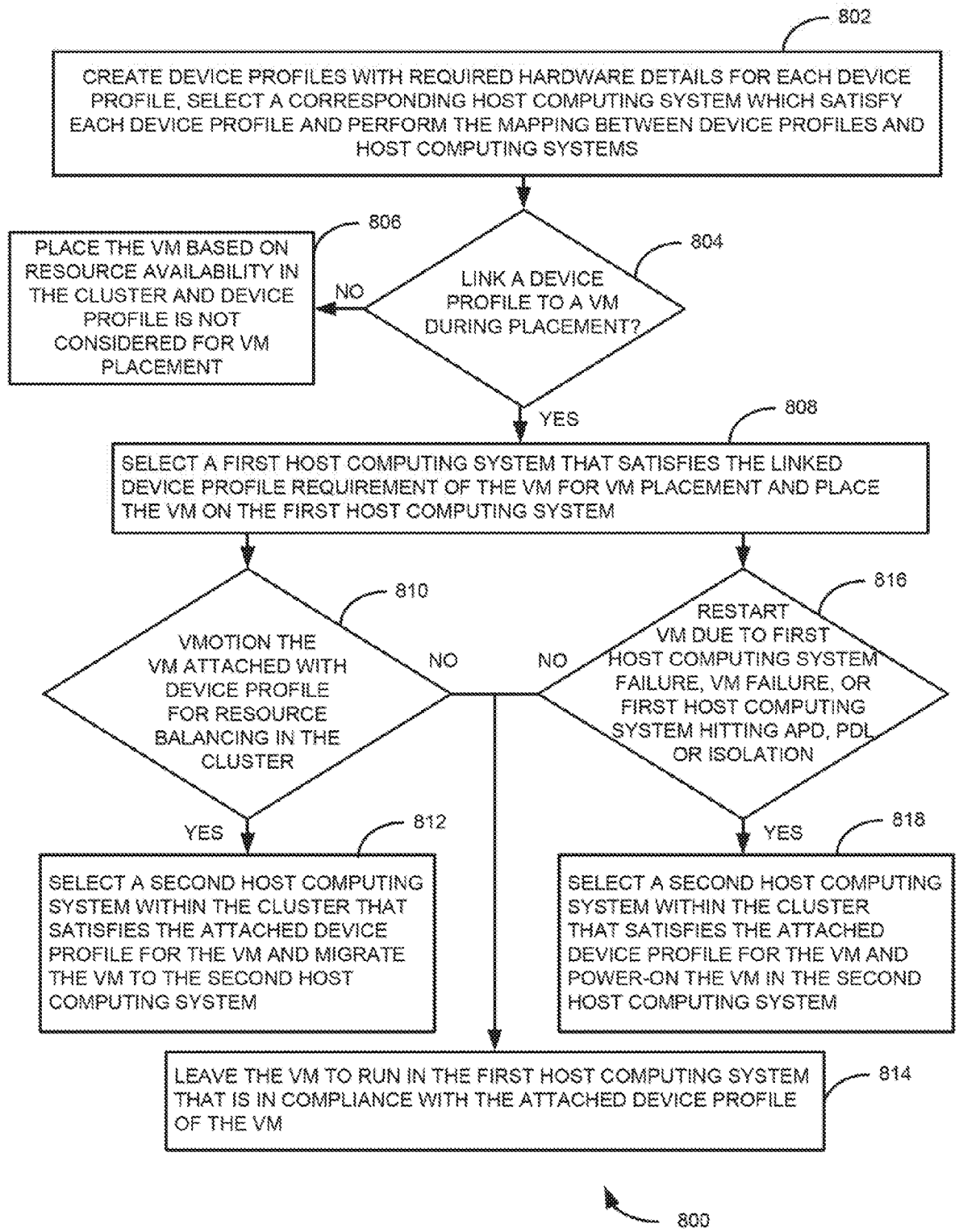
FIG. 8 is a detailed flow diagram of the example method for placing the VM on the host computing system based on the device profile associated with the VM.

FIG. 8 is a detailed flow diagram 800 of the example method for placing a VM on a host computing system based on a device profile associated with the VM. At step 802, device profiles with required hardware details may be created for each device profile. Further at 802, a corresponding host computing system which satisfy each device profile may be selected by a device profile manager, and mapping between device profiles and host computing systems may be performed by the device profile manager.

At 804, a check is made to determine whether to link a device profile to a VM during placement. At 806, the VM can be placed based on resource availability in the cluster without considering the device profile when the device profile is not linked to the VM during placement.

At 808, a first host computing system that satisfies the linked device profile requirement for the VM may be selected for the VM placement and the VM may be placed on the first host computing system when the device profile is linked to the VM during provision.

In one example, a check is made to determine whether to migrate/vmotion the VM attached with the device profile for resource balancing in the cluster, at 810. At 812, a second host computing system that satisfies the attached device profile for the VM may be selected and the VM may be migrated to the second host computing system when the VM migration is needed for resource balancing in the cluster. When the VM migration is not needed for resource balancing in the cluster, the VM may continue to run in the first host computing system that is in compliance with the attached device profile for the VM at 814. Steps 810 and 812 can be implemented as a part of VMware DRS™ offered by VMware.

In one example, a check is made to determine whether to restart the VM due to high availability failover (i.e., first host computing system failure, VM failure, or first host computing system hitting all-paths-down (APD) situation, permanent device loss (PDL) or isolation), at 816. At 818, a second host computing system that satisfies the attached device profile for the VM may be selected and the VM may be powered in the second host computing system when powering-on the VM is needed due to high availability failover. When the VM powering-on is not needed, the VM may continue to run in the first host computing system that is in compliance with the attached device profile for the VM at 814. Steps 816 and 818 can be implemented as a part of VMware HA offered by VMware.

Although the flow diagram of FIGS. 7 and 8 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

Figure 9:
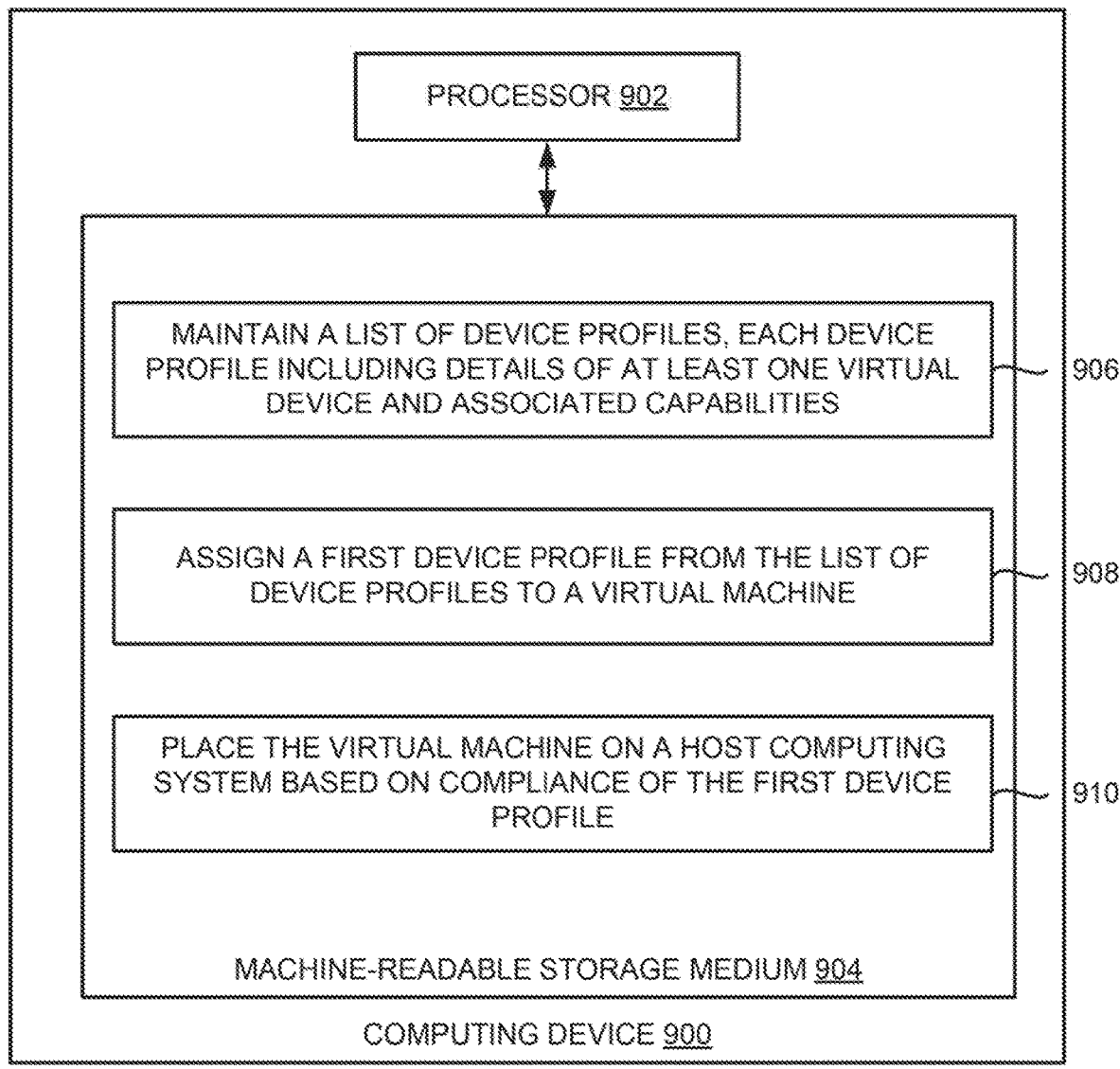
FIG. 9 is a block diagram of an example computing device for placing VMs on the host computing systems based on compliance of the device profiles.

FIG. 9 is a block diagram of an example computing device 900 for placing of VMs on the host computing systems based on compliance of the device profiles. The computing device 900 includes a processor 902 and a machine-readable storage medium 904 communicatively coupled through a system bus. The processor 902 may be any type of central processing unit (CPU), microprocessor, or processing logic that interprets and executes machine-readable instructions stored in the machine-readable storage medium 904. The machine-readable storage medium 904 may be a random-access memory (RAM) or another type of dynamic storage device that may store information and machine-readable instructions that may be executed by the processor 902. For example, the machine-readable storage medium 904 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 904 may be a non-transitory machine-readable medium. In an example, the machine-readable storage medium 904 may be remote but accessible to the computing device 900.

The machine-readable storage medium 904 may store instructions 906, 908, and 910. In an example, instructions 906, 908, and 910 may be executed by processor 902 for placement (e.g., provisioning, migrating, powering-on, and the like) a VM on a host computing system based on compliance of the device profile associated with the VM. Instructions 906 may be executed by processor 902 to maintain a list of device profiles, each device profile including details of at least one virtual device and associated capabilities. Instructions 908 may be executed by processor 902 to assign a first device profile from the list of device profiles to a VM. Instructions 910 may be executed by processor 902 to place the VM on a host computing system based on compliance of the device profile.

The machine-readable storage medium 904 may include instructions to maintain mapping information in memory, the mapping information maps the list of device profiles to a corresponding one of the host computing systems that supports the device profiles. Further, machine-readable storage medium 904 may include instructions to identify the host computing system that complies with the first device profile based on the mapping information, and place the VM on the identified host computing system based on the compliance.

In one example, non-transitory machine-readable medium 904 may include instructions to establish a communication with the plurality of host computing systems, obtain information related to addition, modification or deletion of virtual devices and associated versions in the plurality of host computing systems, and update the mapping information in the memory associated with computing device 900 (e.g., management server 104) based on the obtained information.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    maintaining a list of device profiles, each device profile including details of at least one virtual device and associated capabilities;
    assigning a first device profile from the list of device profiles to a virtual machine;
    checking compliance of the assigned first device profile;
    placing the virtual machine on a first host computing system based on the compliance of the assigned first device profile, wherein placing the virtual machine on the first host computing system comprises determining if migration of the virtual machine is required to satisfy the assigned device profile compliance and in response to the determining that migration of the virtual machine required, migrating the virtual machine to a host computing system that supports the assigned first device profile;
    determining whether migration or cloning of a set of virtual devices without migrating the virtual machine resolves compliance by the virtual machine with the assigned first device profile; and
    upon determining that migration or cloning of the set of virtual devices resolves compliance by the virtual machine with the assigned first device profile, performing an operation to migrate or clone the virtual device and associated configurations from a second host computing system to the first host computing system.

2. The method of claim 1, wherein placing the virtual machine on the host computing system comprises:
    selecting the host computing system that supports the first device profile.

3. The method of claim 1, wherein placing the virtual machine on the host computing system comprises:
    selecting the host computing system that supports the first device profile; and
    powering on the virtual machine on the selected host computing system during high availability failover.

4. The method of claim 1, further comprising:
    maintaining mapping information, wherein the mapping information maps the list of device profiles to a corresponding one of a plurality of host computing systems that supports the device profiles.

5. The method of claim 4, wherein placing the virtual machine on the host computing system based on compliance of the first device profile comprises:
    identifying the host computing system that complies with the first device profile based on the mapping information; and
    placing the virtual machine on the identified host computing system based on the compliance of the first device profile.

6. The method of claim 1, wherein the at least one virtual device is associated with a physical device.

7. A system comprising:
    a plurality of host computing systems, each host computing system including virtual machines running therein; and
    a management server communicative with the plurality of host computing systems, wherein the management server includes a device profile manager to:
        maintain a list of device profiles, each device profile including details of at least one virtual device and associated capabilities;
        assign a first device profile from the list of device profiles to a virtual machine;
        check compliance of the assigned first device profile;

place the virtual machine on a first host computing system based on the compliance of the assigned first device profile, wherein placing the virtual machine on the host computing system comprises determining if migration of the virtual machine is required to satisfy the assigned device profile compliance and in response to the determining that migration of the virtual machine required, migrating the virtual machine to a host computing system that supports the assigned first device profile;

determine whether migration or cloning of a set of virtual devices without migrating the virtual machine resolves compliance by the virtual machine with the assigned first device profile; and upon determining that migration or cloning of the set of virtual devices resolves compliance by the virtual machine with the assigned first device profile, perform an operation to migrate or clone the virtual device and associated configurations from a second host computing system to the first host computing system.

8. The system of claim 7, wherein the device profile manager is to:
select the host computing system that supports the first device profile.

9. The system of claim 7, wherein the device profile manager is to:
select the host computing system that supports the first device profile; and
power on the virtual machine on the selected host computing system during high availability failover.

10. The system of claim 7, wherein the device profile manager is to:
maintain mapping information in the management server, wherein the mapping information maps the list of device profiles to a corresponding one of the plurality of host computing systems that supports the device profiles.

11. The system of claim 10, wherein the device profile manager is to:
identify the host computing system that complies with the first device profile based on the mapping information; and
place the virtual machine on the identified host computing system based on the compliance of the first device profile.

12. The system of claim 10, wherein the device profile manager is to:
obtain information related to addition, modification, or deletion of virtual devices and associated versions in the plurality of host computing systems via a device profile agent residing in each of the plurality of host computing systems; and
update the mapping information based on the obtained information.

13. The system of claim 7, wherein the at least one virtual device is associated with a physical device.

14. A non-transitory machine-readable medium storing instructions executable by a processing resource to:
maintain a list of device profiles, each device profile including details of at least one virtual device and associated capabilities;
assign a first device profile from the list of device profiles to a virtual machine;
check compliance of the assigned first device profile;
place the virtual machine on a first host computing system based on the compliance of the assigned first device profile, wherein placing the virtual machine on the first host computing system comprises determining if migration of the virtual machine is required to satisfy the assigned device profile compliance and in response to the determining that migration of the virtual machine required, migrating the virtual machine to a host computing system that supports the assigned first device profile;
determine whether migration or cloning of a set of virtual devices without migrating the virtual machine resolves compliance by the virtual machine with the assigned first device profile; and
upon determining that migration or cloning of the set of virtual devices resolves compliance by the virtual machine with the assigned first device profile perform an operation to migrate or clone the virtual device and associated configurations from a second host computing system to the first host computing system.

15. The non-transitory machine-readable medium of claim 14, further comprising instructions to:
maintain mapping information in a memory, wherein the mapping information maps the list of device profiles to a corresponding one of a plurality of host computing systems that supports the device profiles.

16. The non-transitory machine-readable medium of claim 15, wherein placing the virtual machine on the host computing system based on compliance of the first device profile comprises:
identifying the host computing system that complies with the first device profile based on the mapping information; and
placing the virtual machine on the identified host computing system based on the compliance of the first device profile.

17. The non-transitory machine-readable medium of claim 15, comprising instructions to:
establish a communication with the plurality of host computing systems;
obtain information related to addition, modification or deletion of virtual devices and associated versions in the plurality of host computing systems; and
update the mapping information in the memory based on the obtained information.

18. The non-transitory machine-readable medium of claim 14, wherein placing the virtual machine on the host computing system comprises:
selecting the host computing system that supports the first device profile.

19. The non-transitory machine-readable medium of claim 14, wherein placing the virtual machine on the host computing system comprises:
selecting the host computing system that supports the first device profile; and
powering on the virtual machine on the selected host computing system during high availability failover.

20. The non-transitory machine-readable medium of claim 14, wherein the at least one virtual device is selected from a group consisting of a virtual network interface card (vNIC), a virtual compact disc read-only-memory (vCDROM), a virtual graphics processing unit (vGPU) card, a virtual small computer system interface (vSCSI) card, and a raw device mapping (RDM) disk.

* * * * *